United States Patent
Ishikawa (10) Patent No.: US 7,729,843 B2
(45) Date of Patent: Jun. 1, 2010

(54) ENGINE CONTROL METHOD AND ENGINE CONTROL SYSTEM

(75) Inventor: Naoya Ishikawa, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 90 days.

(21) Appl. No.: 12/162,860

(22) PCT Filed: Dec. 8, 2006

(86) PCT No.: PCT/JP2006/324564

§ 371 (c)(1),
(2), (4) Date: Jul. 31, 2008

(87) PCT Pub. No.: WO2007/091370

PCT Pub. Date: Aug. 16, 2007

(65) Prior Publication Data

US 2009/0024305 A1    Jan. 22, 2009

(30) Foreign Application Priority Data

Feb. 7, 2006    (JP) ............................. 2006-030007

(51) Int. Cl.
*F02D 41/00* (2006.01)
*F02D 41/04* (2006.01)
(52) U.S. Cl. .................. 701/103; 123/568.21
(58) Field of Classification Search ................. 701/103, 701/102, 114; 123/568.21, 672

See application file for complete search history.

(56) References Cited

U.S. PATENT DOCUMENTS 6,739,295 B1    5/2004    Yamaoka et al.
7,270,118 B2 *  9/2007    Yamaoka et al. ............ 123/672

FOREIGN PATENT DOCUMENTS

| JP | 2002-327638 A | * | 11/2002 |
| JP | 2002-371893 A |   | 12/2002 |
| JP | 2003-286876 A |   | 10/2003 |
| WO | 0214665 A1    |   | 2/2002  |

OTHER PUBLICATIONS

International Search Report for PCT/JP2006/324564 dated Mar. 2, 2007.

* cited by examiner

*Primary Examiner*—Hieu T Vo
(74) *Attorney, Agent, or Firm*—McCormick, Paulding & Huber LLP (57) ABSTRACT

An engine control method and an engine control system that can inhibit the emission of NOx and reduce noise are provided. An engine control method in which an engine 2 is caused to perform diffusion combustion at normal times and switched from diffusion combustion to premixed combustion when an engine load is low, wherein when the engine 2 is switched from the diffusion combustion to the premixed combustion, an oxygen concentration in an intake air of the engine 2 is found and when the found oxygen concentration exceeds a threshold of NOx generation oxygen concentration that has been set in advance, switching from the diffusion combustion to a fuel injection mode of the premixed combustion is stopped, and when the found oxygen concentration then becomes equal to or less than the threshold of NOx generation oxygen concentration, switching is performed to the premixed combustion.

6 Claims, 6 Drawing Sheets

ENGINE CONTROL METHOD AND ENGINE CONTROL SYSTEM

CROSS REFERENCE TO RELATED APPLICATIONS

This application is entitled to the benefit of and incorporates by reference essential subject matter disclosed in International Patent Application No. PCT/JP2006/324564 filed on Dec. 8, 2006 and Japanese Patent Application No. 2006-030007 filed Feb. 7, 2006.

TECHNICAL FIELD

The present invention relates to an engine control method and an engine control system in which an engine is switched between diffusion combustion and premixed combustion according to the operation region.

BACKGROUND ART

A novel combustion mode called premixed combustion (referred to hereinbelow as PCI combustion) has recently been suggested. In this system, fuel injection is carried out at a timing earlier than that for usual diesel combustion (referred to hereinbelow as diffusion combustion) and mixing of fuel and air is substantially enhanced to improve the engine exhaust gas. In the PCI combustion, exhaust gas recirculation (referred to hereinbelow as EGR) is performed with a high EGR ratio to obtain a low-oxygen atmosphere, thereby suppressing preignition and thus realizing low-NOx and low-SOOT (soot) combustion.

PCI combustion is typically limited to low-load operation regions. Accordingly, a combustion control method is known by which switching between the diffusion combustion and PCI combustion is performed according to the engine operation region.

For example, Japanese Patent Application Laid-open No. 2002-327638 suggests a diesel engine in which switching between PCI combustion and diffusion combustion is performed according to the operation region.

In the diesel engine described in Japanese Patent Application Laid-open No. 2002-327638, when switching is performed from diffusion combustion to PCI combustion, a control is performed to forcibly change the amount of air (amount of oxygen) so as to obtain an optimum amount of air for PCI combustion.

DISCLOSURE OF THE INVENTION

However, the problem associated with the above-described combustion control method is that when the engine control mode is switched from the diffusion combustion mode to the PCI combustion mode, the exhaust gas performance and combustion noise are degraded.

For example, where PCI combustion is started (where fuel is injected in the PCI combustion mode) in a state in which the engine is in a motoring mode (fuel injection amount is 0), for example, as the vehicle decelerates, the fuel is preignited from a state with a comparatively high oxygen concentration in the intake air in the intake manifold or the like, a large amount of NOx is emitted, and combustion noise is worsened.

Further, even when the control that forcibly changes the amount of air has been performed, a response delay occurs because the level of difficulty of the control has increased. As a result, there is a risk of injecting the fuel in a state in which the amount of air that is optimum for PCI combustion is not obtained and increasing the amount of NOx and the like.

Accordingly, it is an object of the present invention to provide an engine control method and an engine control system that resolve the above-described problems and can inhibit the emission of NOx and reduce noise during the transition from diffusion combustion to premixed combustion.

In order to attain the above-described object, the present invention provides an engine control method in which an engine is caused to perform diffusion combustion at normal times and switched from diffusion combustion to premixed combustion when an engine load is low, wherein when the engine is switched from the diffusion combustion to the premixed combustion, an oxygen concentration in an intake air of the engine is found, and when the found oxygen concentration exceeds a threshold set in advance such that the threshold correlates to a predetermined NOx generation level (referred to hereinbelow as NOx generation oxygen concentration), switching from the diffusion combustion to a fuel injection mode of the premixed combustion is stopped, and when the found oxygen concentration then becomes equal to or less than the threshold set in advance such that the threshold correlates to a predetermined NOx generation oxygen concentration, switching is performed to the premixed combustion.

It is preferred that the threshold of NOx generation oxygen concentration be set correspondingly to a revolution speed and a fuel injection amount of the engine.

It is preferred that the engine be switched to the premixed combustion when the engine makes a transition from a motoring state to an idle state.

It is preferred that exhaust gas recirculation, in which part of the exhaust of the engine is recirculated to the intake air be performed at least during the premixed combustion, and a premixed target exhaust gas recirculation ratio during the premixed combustion be set higher than a diffusion target exhaust gas recirculation ratio during the diffusion combustion, and when the engine is switched from the diffusion combustion to the premixed combustion, exhaust gas recirculation be performed at the premixed target exhaust gas recirculation ratio and the concentration of oxygen in the intake air of the engine be decreased prior to switching to the premixed combustion.

In order to attain the above-described object, the present invention provides an engine control system in which an engine is caused to perform diffusion combustion at normal times and switched from diffusion combustion to premixed combustion when an engine load is low, comprising load measurement means for measuring a load of the engine; combustion control means for switching the engine between the diffusion combustion and premixed combustion and performing combustion control; and oxygen concentration measurement means for measuring a concentration of oxygen contained in an intake air of the engine, wherein the combustion control means switches the engine to the premixed combustion when the engine load measured by the load measurement means is equal to or less than a predetermined switching load, and the oxygen concentration detected by the oxygen concentration detection means is equal to or less than a predetermined threshold of NOx generation oxygen concentration.

In accordance with the present invention, an excellent effect of inhibiting the NOx emission from the engine and reducing the noise during a transition from diffusion combustion to premixed combustion is demonstrated.

BEST MODE FOR CARRYING OUT THE INVENTION

The preferred embodiment of the present invention will be described below with reference to the appended drawings.

The engine control system of the present embodiment can be applied, for example, to a diesel engine that is installed on a vehicle such as a truck (referred to hereinbelow as "engine").

The engine control system of the present embodiment will be explained based on FIG. 1.

Figure 1:
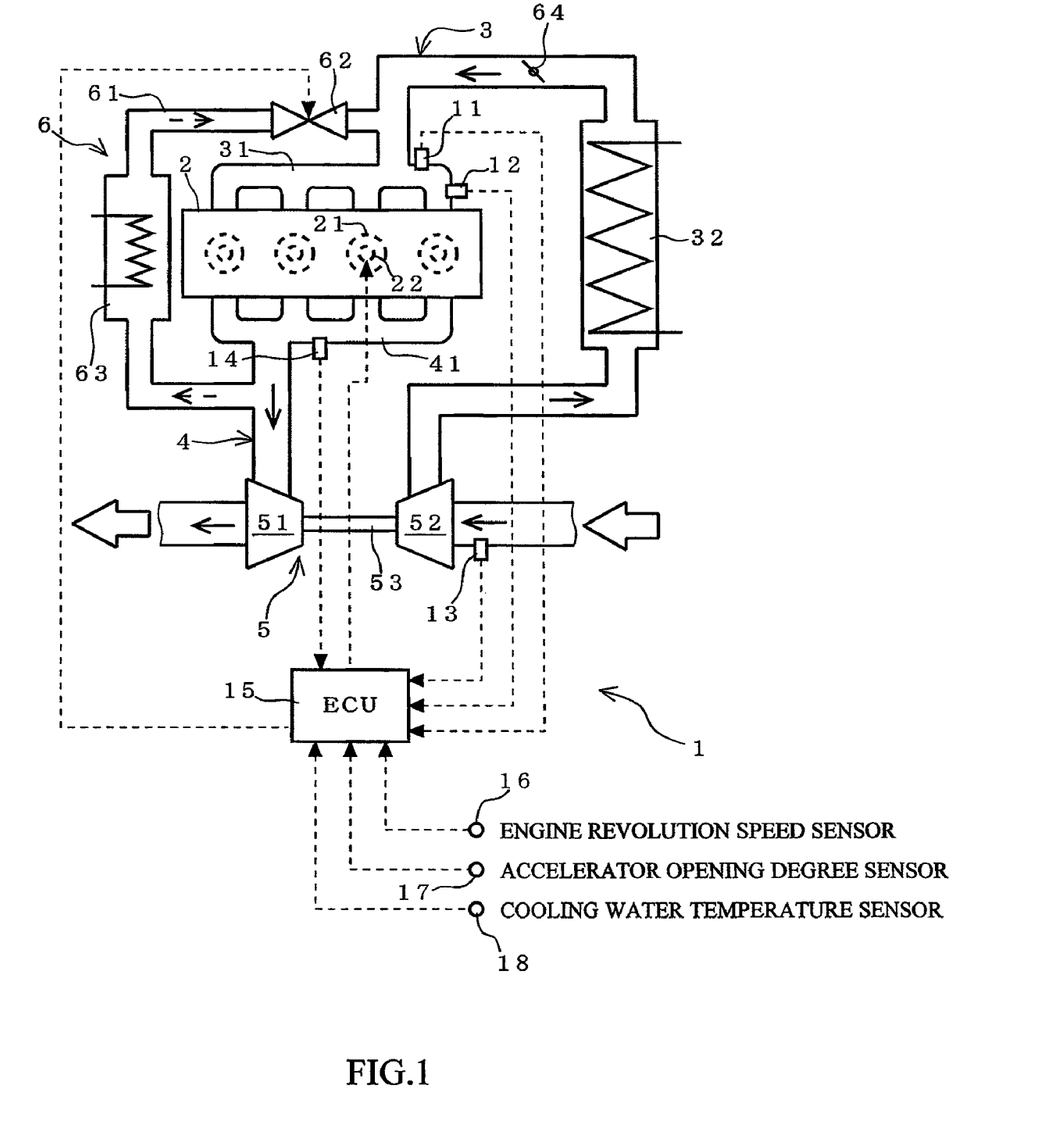
FIG. 1 illustrates an engine control system according to one embodiment in accordance with the present invention.

As shown in FIG. 1, a plurality of cylinders 21 are formed in an engine 2, and an injector 22 for injecting fuel is provided in each cylinder 21. An intake passage 3 is connected via an intake manifold 31 to the cylinders 21, and an exhaust passage 4 is connected via an exhaust manifold 41.

The engine 2 is provided with a supercharger 5 for supercharging and feeding the intake air to each cylinder 21. The supercharger 5 comprises a turbine 51 that is disposed in the exhaust passage 4 and is rotary driven by exhaust gas, a compressor 52 that is disposed in the intake passage 3 and serves to compress the intake air, and a rotary shaft 53 that connects the turbine 51 to the compressor 52.

A boost pressure sensor 11 for detecting the boost pressure of the compressor 52 and an intake air temperature sensor 12 for detecting the intake air temperature are provided in the intake manifold 31 of the intake passage 3. In the intake passage 3 upstream of the intake manifold 31, there are provided, in the order of description from the engine 2 side (downstream side), an air cooler 32, the compressor 52 of the supercharger 5, and a MAF sensor 13 for detecting the intake air amount (new air amount).

In the exhaust passage 4, there are provided, in the order of description from the engine 2 side (upstream side), an exhaust gas temperature sensor 14 for detecting the exhaust gas temperature and the turbine 51 of the supercharger 5.

Further, the engine 2 is also provided with an EGR device 6 for returning part of exhaust gas in the intake passage 3. The EGR device 6 comprises an EGR passage 61 for connecting the exhaust passage 4 with the intake passage 3, an EGR valve 62 that is disposed in the EGR passage 61 and serves to regulate the flow rate of exhaust gas in the EGR passage 61, and an EGR cooler 63 for cooling the exhaust gas in the EGR passage 61. A throttle valve 64 for further increasing the EGR ratio is provided in the passage 3.

In the above-described engine 2, the combustion mode (for example, the diffusion combustion and PCI combustion) is switched by the engine control system 1 of the present embodiment according to the operation state of the engine 2.

More specifically, the engine control system 1 of the present embodiment basically causes the engine 2 to perform diffusion combustion at normal times and switches the engine 2 from the diffusion combustion to the PCI combustion when the engine load is low. The engine control system 1 comprises load measurement means for measuring a load of the engine 2, combustion control means for switching the engine 2 between the diffusion combustion and PCI combustion and performing combustion control, and oxygen concentration measurement means for measuring a concentration of oxygen (referred to hereinbelow as intake air $O_2$ concentration) contained in the intake air of the engine 2.

The combustion control means of the present embodiment is composed of an engine control unit (referred to hereinbelow as ECU) 15 for controlling the engine 2 and switching the engine 2 to PCI combustion when the engine load measured by the load measurement means is equal to or less than a predetermined switching load and the intake air $O_2$ concentration detected by the oxygen concentration detection means is equal to or less than a predetermined threshold of NOx generation oxygen concentration (referred to hereinbelow as $O_2$ concentration threshold), this operation being described hereinbelow in greater detail.

The oxygen concentration measurement means of the present embodiment is composed of the ECU 15, boost pressure sensor 11, intake air temperature sensor 12, and MAF sensor 13. The oxygen concentration measurement means may be an $O_2$ concentration sensor attached to the intake manifold 31.

The boost pressure sensor 11, intake air temperature sensor 12, and MAF sensor 13 are connected to the ECU 15, and the ECU 15 computes and evaluates the $O_2$ concentration (air intake $O_2$ concentration) in the intake air that is sucked into the cylinder 21 based on the detected values inputted from the sensors 11 to 13.

Further, an $O_2$ concentration threshold is set correspondingly to the revolution speed of the engine 2 and fuel injection amount.

Figure 5:
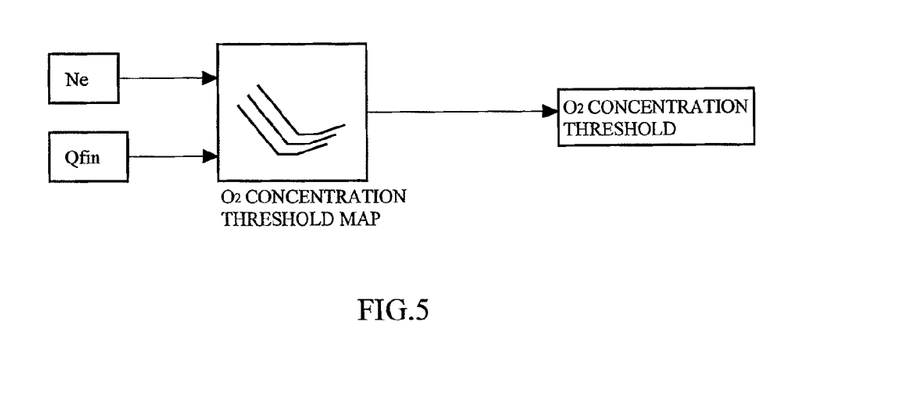
FIG. 5 is a computation logic diagram of an $O_2$ concentration threshold based on the engine control method of the embodiment.

For example, an $O_2$ concentration threshold map that describes the relationship between the engine revolution speed Ne, fuel injection amount Qfin, and $O_2$ concentration threshold, such as shown in FIG. 5, is found in advance by tests or the like. The ECU 15 is provided with storage means (not shown in the figures) for storing the $O_2$ concentration threshold map.

Returning to FIG. 1, the load measurement means of the present embodiment is composed of the ECU 15, an engine revolution speed sensor 16, and an accelerator opening degree sensor 17.

The engine revolution speed sensor 16 and accelerator opening degree sensor 17 are connected to the ECU 15, and the ECU 15 computes and evaluates the load of the engine 2 based on the detected values inputted from these sensors 16, 17.

Further, a coolant water temperature sensor 18 and an exhaust gas temperature sensor 14 are also connected to the ECU 15, and the detected values of the sensors are inputted therein.

Based on the input of the above-described sensors 11 to 14, 16 to 18, the ECU 15 controls a fuel system actuator such as an injector 22 by a control mode (diffusion combustion mode, PCI combustion mode) corresponding to the combustion mode that has to be executed, for example, the diffusion combustion and PCI combustion.

More specifically, the ECU 15 is connected so as to output the control signals to the injector 22 and determines the fuel injection amount and the fuel injection period of the injector 22 based on the engine load and combustion mode (diffusion combustion, PCI combustion).

The ECU 15 is also connected to air system actuators such as the EGR valve 62 of the EGR device 6, and controls these air system actuators such that they can be opened and closed based on the load and combustion mode of the engine 2.

The ECU 15 of the present embodiment performs the EGR with the EGR device 6 at least during the PCI combustion and sets the premixed target EGR ratio at the time of PCI combustion higher than the diffusion target EGR ratio during diffusion combustion. Here, where no EGR is performed during diffusion combustion, the diffusion target EGR ratio thereof is taken as 0%.

The engine control method of the present embodiment will be explained below based on FIG. 2 to FIG. 8.

First, the general concept of the engine control method of the present embodiment will be explained.

With the engine control method of the present embodiment, basically the engine 2 is caused to perform diffusion combustion at normal times and switched from the diffusion combustion to the PCI combustion when the engine load is low. During such switching, the intake air $O_2$ concentration is monitored and in the case where the concentration is not equal to or lower than a certain threshold ($O_2$ concentration threshold), fuel injection in the PCI combustion mode is not performed and fuel injection in the conventional diffusion combustion mode is performed even within the operation region in which the PCI combustion is possible.

In other words, in the present embodiment, when the engine 2 is switched from the diffusion combustion to the PCI combustion by the ECU 15, the intake air $O_2$ concentration of the engine 2 is found with the oxygen concentration detection means, and when the found intake air $O_2$ concentration exceeds the predetermined $O_2$ concentration threshold, the switching from the diffusion combustion to the PCI combustion is stopped by the ECU 15, and when the found intake air $O_2$ concentration thereafter becomes equal to or less than the $O_2$ concentration threshold, the fuel injection mode is switched to the PCI combustion.

The engine control method of the present embodiment will be described below in greater detail based on FIG. 2.

Figure 2:
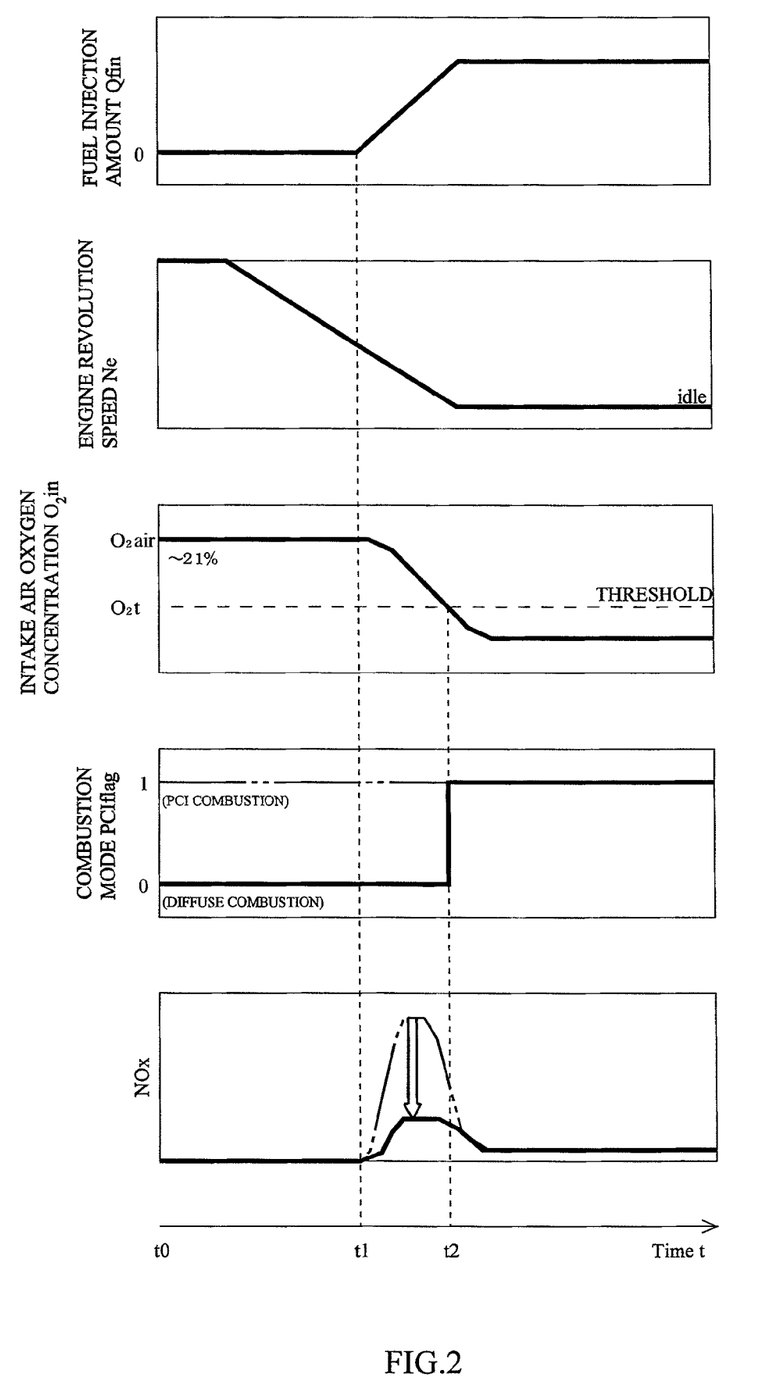
FIG. 2 is a flow diagram of the engine control method of the embodiment.

FIG. 2 shows the fuel injection amount Qfin, engine revolution speed Ne, intake air $O_2$ concentration $O_2$in, combustion mode PCIflag (PCI combustion mode when PCIflag=1 and diffusion combustion mode when PCIflag=0), and NOx emission amount in the order of description from the top stage; time t is plotted against the ordinate.

The engine control method of the present embodiment is executed when fuel injection (at t1 or later) is started from the speed reduced state (t0 to t1) of the vehicle and idling is initiated. In other words, when the engine 2 makes a transition from the motoring state to the idle state, the ECU 15 switches the engine 2 to the premixed combustion mode.

At the time t0 to t1, the vehicle is in a speed reduction mode and the fuel injection quantity Qfin becomes 0 (see first stage in FIG. 2, Qfin=0). Where the motoring state (that is, a state in which the fuel injection amount is 0 and the engine 2 revolves) is maintained for a long time, as in the speed reduction mode, the $O_2$ concentration in the EGR gas increases and the intake air $O_2$ concentration $O_2$in in the intake manifold 31 returns to the atmospheric level (about 21%) $O_2$ air (see third stage in FIG. 2).

At the aforementioned time t0 to t1, the intake air $O_2$ concentration $O_2$in exceeds the preset $O_2$ concentration threshold $O_2$t. Therefore, the ECU 15 temporarily stops the switching from the diffusion combustion mode to the PCI combustion mode of the fuel injection mode.

At the time t1, the ECU 15 has to set the engine 2 into an idling state and starts fuel injection (Qfin>0).

Further, at the time t1, the ECU 15 performs the exhaust gas recirculation at a premixed target EGR ratio and decreases the air intake $O_2$ concentration $O_2$in of the engine 2 (see third stage of FIG. 2). More specifically, the ECU 15 performs control to open the EGR valve 62. Thus, when the ECU 15 of the present embodiment causes the engine 2 to make a transition from the motoring state to the idle state, the ECU 15 performs the EGR at the premixed target EGR ratio even during the diffusion combustion mode of the engine 2 (in other words, even before switching to the PCI combustion mode).

After the time t1, the intake air $O_2$ concentration $O_2$in is decreased by the EGR, and at the time t2, the intake air $O_2$ concentration becomes equal to or lower than the $O_2$ concentration threshold $O_2$t. Accordingly, the ECU 15 switches the engine 2 from the diffusion combustion mode to the PCI combustion mode at the time t2. More specifically, the ECU 15 switches the control of the fuel injection period or fuel injection amount of the injector 22.

Thus, in the present embodiment, if the $O_2$ concentration $O_2$in in the air intake in the intake manifold 31 is not lower than the intake air $O_2$ concentration threshold $O_2$t, the PCI combustion mode is not assumed. As a result, the generation of NOx caused by preignition of PCI combustion is reduced and the combustion noise is also reduced.

Here, in the graph of the NOx emission amount in the lowermost stage of FIG. 2, an example of switching the engine 2 from the diffusion combustion mode to the PCI combustion mode before the time to is shown by a dash-dot line. In this example, if the fuel injection in the PCI combustion mode is started at the time t1, because the air intake $O_2$ concentration is high, preignition occurs and excessive generation of NOx is induced.

By contrast, in the present embodiment, the preignition is prevented and the emission amount of NOx is inhibited (see the lowermost stage of FIG. 2).

An example of the engine control method of the present embodiment will be explained below based on the flow chart shown in FIG. 3.

Figure 3:
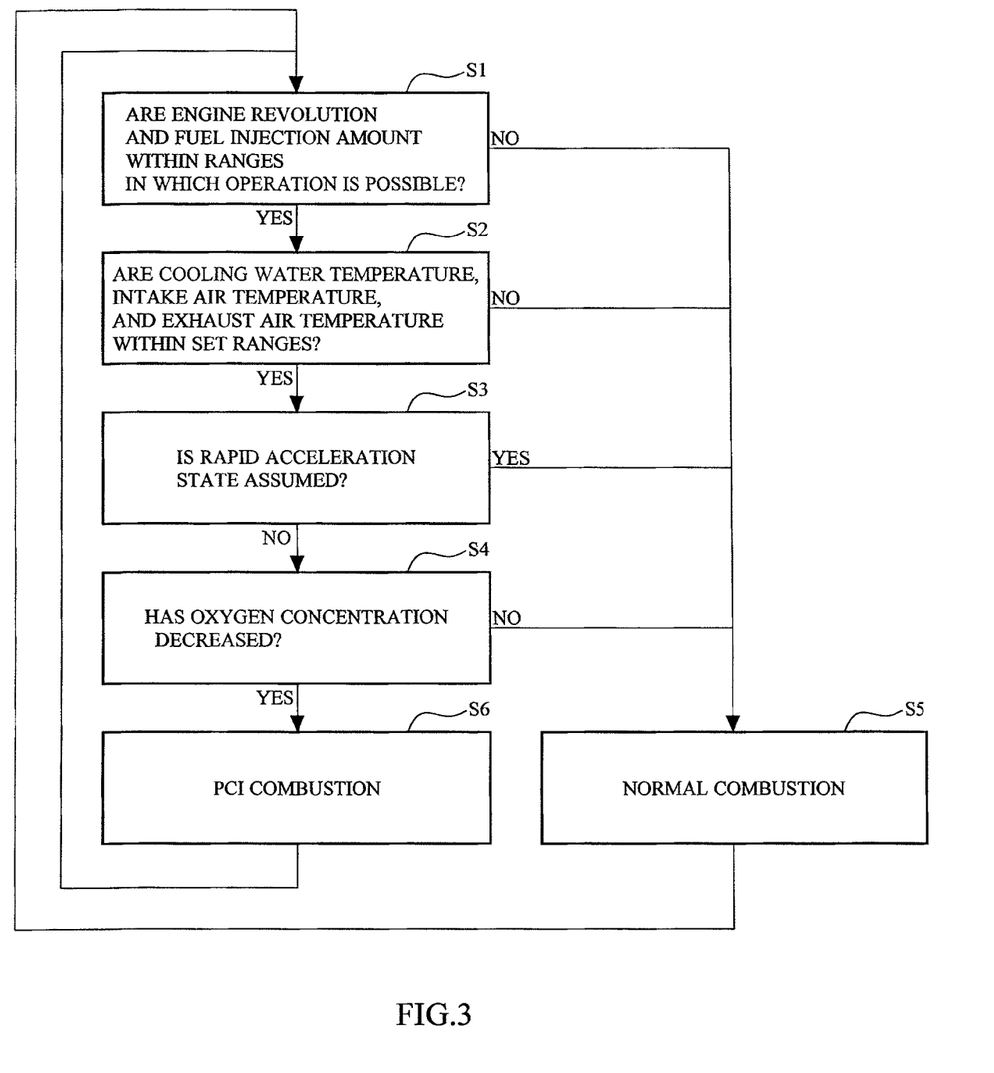
FIG. 3 is a flowchart of the engine control method of the embodiment.

As shown in FIG. 3, in step S1, the ECU 15 determines whether the engine revolution speed detected by the engine revolution speed sensor 16 and the fuel injection amount calculated by the ECU 15 itself are within the ranges in which the engine 2 can be operated by PCI combustion. In other words, the ECU 15 determines whether the engine load is low. More specifically, the ECU 15 determines whether the engine load measured by the load measurement means is equal to or less than a predetermined switching load.

Where the engine revolution speed and fuel injection amount have been determined in step S1 to be within the ranges in which the PCI combustion is possible, the ECU 15 determines in step S2 as to whether the cooling water temperature detected by the cooling water temperature sensor 18, the intake air temperature detected by the intake air temperature sensor 12, and the exhaust gas temperature detected by the exhaust gas temperature sensor 14 are within the set ranges.

Where the cooling water temperature, intake air temperature, and exhaust gas temperature have been determined in step S2 to be within the set ranges, the ECU 15 determines in step S3 as to whether the vehicle is in a rapid acceleration state. For example, the ECU 15 determines the presence of the rapid acceleration state from the detected values of the engine revolution speed sensor 16 and accelerator opening degree sensor 17.

Where no rapid acceleration state has been determined in step S3, the ECU 15 calculates the intake air $O_2$ concentration from the input values of the boost pressure sensor 11, intake air temperature sensor 12, and MAF sensor 13 and determines as to whether the calculated intake air $O_2$ concentration exceeds the predetermined $O_2$ concentration threshold in step S4.

More specifically, the ECU 15 reads the $O_2$ concentration threshold from the $O_2$ concentration threshold map (see FIG. 5) stored in the ECU 15 based on the calculated fuel injection amount and engine revolution speed from the engine revolution speed sensor 16. The ECU 15 compares the $O_2$ concentration threshold that has been read out with the intake air $O_2$ concentration that has been calculated and evaluated.

Where the intake air $O_2$ concentration has been determined in step S4 to be equal to or less than the predetermined $O_2$ concentration threshold, the ECU 15 causes the injection of fuel in the PCI combustion mode.

On the other hand, where the engine revolution speed and fuel injection amount have been determined in step S1 not to be within the ranges in which the PCI combustion is possible, where the cooling water temperature, intake air temperature, and exhaust gas temperature have been determined in step S2 not to be within the set ranges, where the vehicle has been determined in step S3 to be in a rapid acceleration state, and where the intake air $O_2$ concentration has been determined in step S4 to exceed the predetermined intake air $O_2$ concentration threshold, the ECU 15 causes the injection of fuel in the engine 2 in the diffusion combustion mode.

Thus, the ECU 15 of the present embodiment determines the combustion mode, that is, PCI combustion or conventional combustion, based on the revolution of engine 2, fuel injection amount, cooling water temperature, intake air temperature, and exhaust gas temperature in steps S1 to S3, and additionally based on the intake air $O_2$ concentration in step S4.

The calculation and evaluation of the intake air $O_2$ concentration will be described below in greater detail based on FIG. 4.

Figure 4:
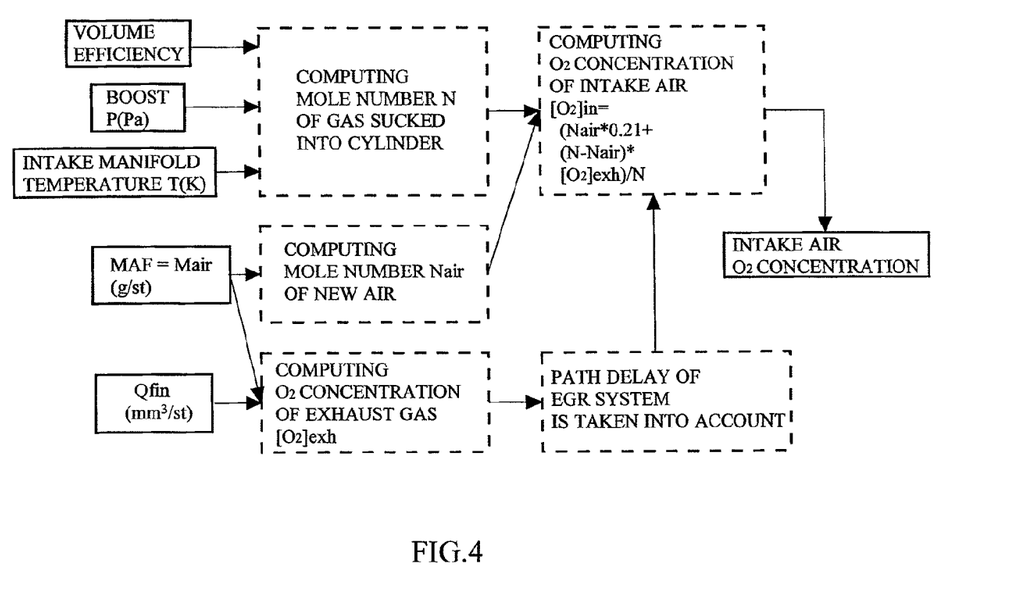
FIG. 4 is a computation flow diagram of intake air $O_2$ concentration based on the engine control method of the embodiment.

As shown in FIG. 4, first, the ECU 15 computes the total mole number N of the gas (sum total of the new air and EGR gas) sucked into the cylinder 21 from the volume efficiency, boost pressure detected by the boost pressure sensor 11, and intake air temperature in the intake manifold 31 detected by the intake air temperature sensor 12. The ECU 15 computes the mole number Nair of the new air from the intake air amount (amount of new air) detected by the MAF sensor 13. The ECU 15 computes the $O_2$ concentration in the exhaust gas (EGR gas) (referred to hereinbelow as exhaust gas $O_2$ concentration) $[O_2]$exh from the intake air amount detected by the MAF sensor 13 and the fuel injection amount Qfin.

Then, the ECU 15 takes into account the path delay of the EGR system and corrects the exhaust gas $O_2$ concentration $[O_2]$exh. The ECU 15 finds the intake air $O_2$ concentration $[O_2]$in from the corrected exhaust gas $O_2$ concentration $[O_2]$exh, the total mole number N, and the mole number Nair of new air.

As described above, the ECU 15 evaluates and monitors the intake air $O_2$ concentration in the intake manifold 31 from the output of the MAF sensor 13, the fuel injection amount and the like.

Figure 6:
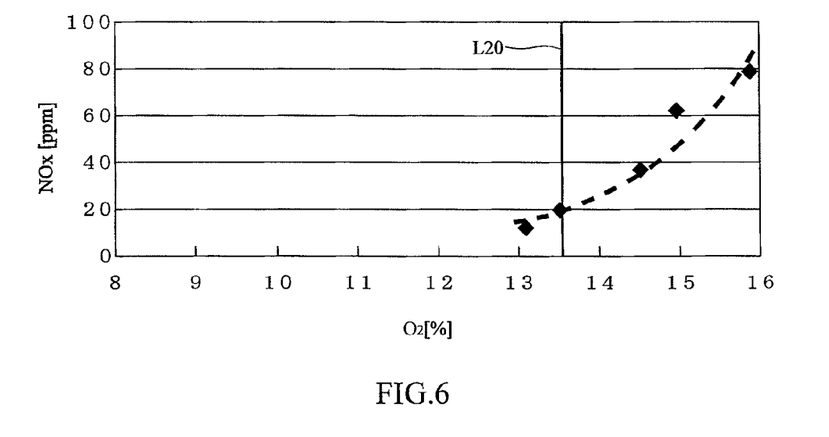
FIG. 6 illustrates the relationship between $O_2$ concentration and NOx emission amount.
Figure 7:
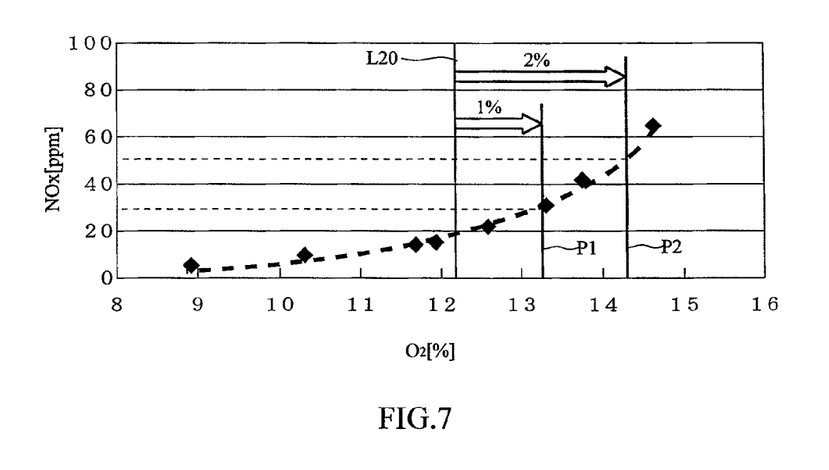
FIG. 7 illustrates the relationship between $O_2$ concentration and NOx emission amount.
Figure 8:
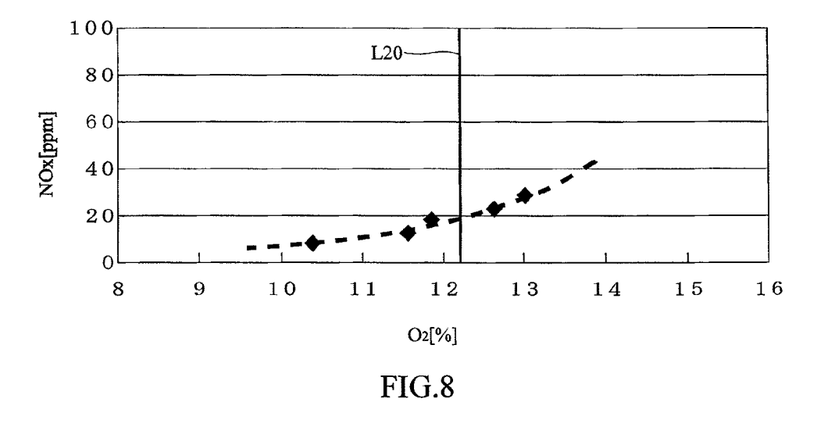
FIG. 8 illustrates the relationship between $O_2$ concentration and NOx emission amount.

The $O_2$ concentration threshold (threshold of NOx generation oxygen concentration) will be described below in greater detail based on FIG. 6 to FIG. 8. FIG. 6 to FIG. 8 show the relationship between the intake air $O_2$ concentration and NOx emission amount in PCI combustion. In FIG. 6 to FIG. 8, the engine revolution speed is 1500 rpm, the fuel injection amount is 10 mm$^3$/st in FIG. 6, 20 mm$^3$/st in FIG. 7, and 25 mm$^3$/st in FIG. 8.

In FIG. 6 to FIG. 8, a line L20 shows the $O_2$ concentration in the intake manifold 31 at which the NOx emission amount becomes 20 ppm (this concentration will be referred to hereinbelow as 20 ppm concentration). Further, in FIG. 7, a line P1 shows an $O_2$ concentration that increased by +1% from the 20 ppm concentration, and a line P2 shows an $O_2$ concentration that increased by +2%.

As shown in FIG. 7, in PCI combustion, where the $O_2$ concentration in the intake manifold 31 increases by +1%, the NOx emission amount rises to about 30 ppm, and where the $O_2$ concentration increases by +2%, the NOx emission amount rises to about 50 ppm. These results show that in the PCI combustion, the NOx emission amount can be reduced with respect to that in the diffusion combustion mode if the $O_2$ concentration is within +2% from 20 ppm.

Thus, the $O_2$ concentration threshold of the present embodiment is set to a value that is about 1.2 times the $O_2$ concentration at which the NOx emission amount is 20 ppm when the PCI combustion is performed in the engine 2.

Thus, in the present embodiment, the NOx emission can be decreased and low-noise combustion can be realized by controlling the combustion mode, with monitoring the $O_2$ concentration in the intake air.

Further, conventionally, when the operation state of an engine was identified to be a PCI combustion region and a control was performed such as to change forcibly the intake air amount, e.g., based on the map of air intake amount and EGR amount, so as to enable the PCI combustion, there was a possibility that the fuel injection amount or EGR amount, which are controlled in relation to the intake air amount, will change due to the change in the intake air amount and that the operation state will deviate from the state in which the premixed combustion has to be performed. By contrast, in the present embodiment, the PCI combustion can be performed reliably.

The present invention is not limited to the above-described embodiment and a variety of modification examples and application examples can be considered.

For example, in the present embodiment the oxygen concentration detection means is configured of the boost pressure sensor 11, intake air temperature sensor 12, MAF sensor 13, and ECU 15, but such configuration is not limiting, and an $O_2$ sensor serving an oxygen concentration detection means may be mounted on the air intake passage 3 of the intake manifold 31 or the like to measure the concentration of oxygen contained in the intake air of the engine 2. In this case, the control of ECU 15 can be simplified.

Further, in the above-described embodiment, the $O_2$ concentration threshold is directly stored in the ECU 15, but such configuration is not limiting. For example, it is also possible to store in advance the target intake air $O_2$ concentration map that indicates the relationship between the target intake air $O_2$ concentration, engine revolution speed, and fuel injection amount during PCI combustion in the ECU 15, and when the engine 2 is switched from the diffusion combustion to the premixed combustion, the ECU 15 reads the target intake air $O_2$ concentration from the target intake air $O_2$ concentration map based on the engine revolution speed sensor 16 and fuel injection amount computed, and find the $O_2$ concentration threshold from the target intake air $O_2$ concentration.

Figure 9:
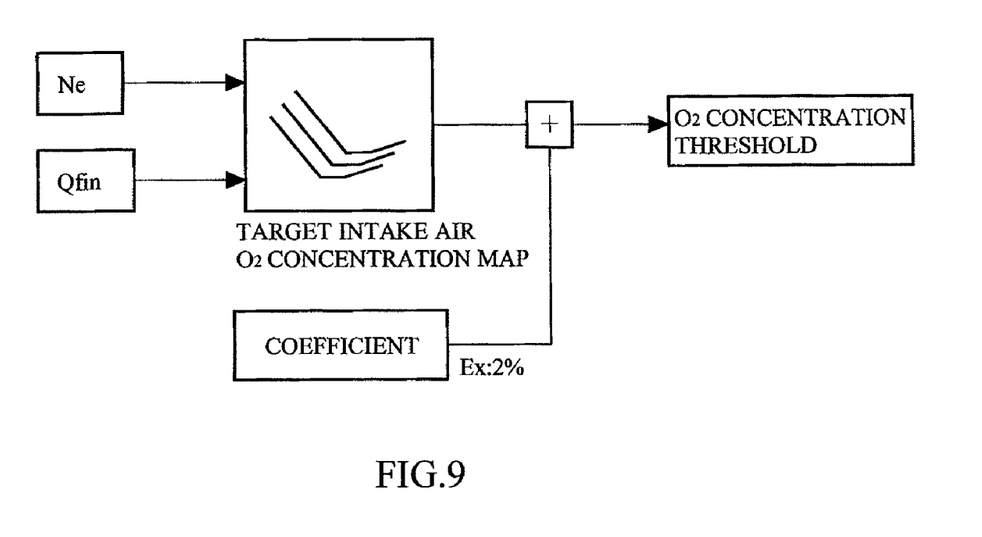
FIG. 9 is a computation logic diagram of an $O_2$ concentration threshold based on the engine control method of another embodiment.
Figure 10:
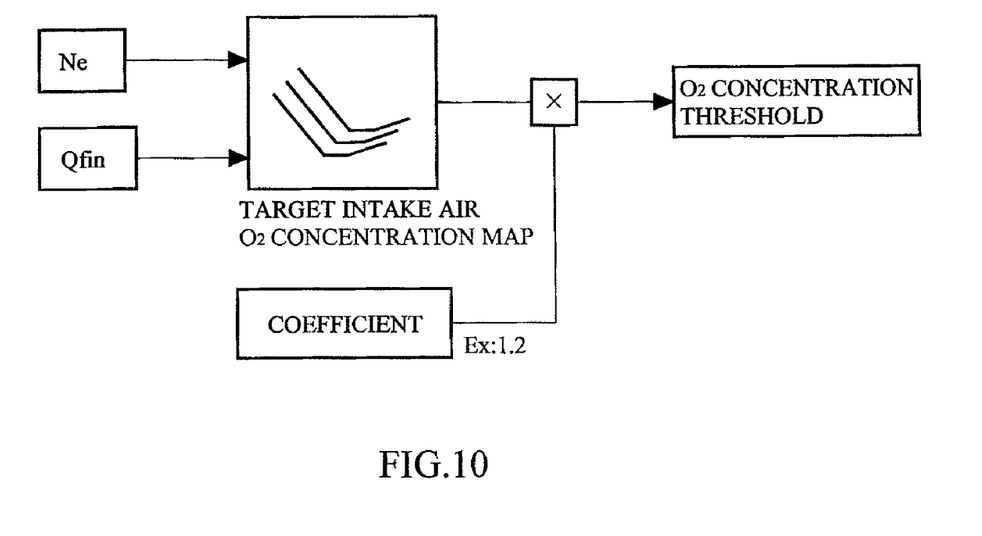
FIG. 10 is a computation logic diagram of an $O_2$ concentration threshold based on the engine control method of another embodiment.

More specifically, it is possible to compute the $O_2$ concentration threshold by adding a predetermined coefficient (2% in the example shown in the figure) to the target intake air $O_2$ concentration as shown in FIG. 9, or to compute the $O_2$ concentration threshold by multiplying the target intake air $O_2$ concentration by the predetermined coefficient (1.2 in the example shown in the figure) as shown in FIG. 10.

Further, in the present embodiment, the EGR is performed at the premixed target EGR ratio prior to switching the PCI combustion mode when the engine 2 is caused to make a transition from the motoring state to the idle state, but this configuration is not limiting and it is also possible to perform the EGR at the diffusion target EGR ratio prior to switching the PCI combustion mode and perform the EGR at the premixed target EGR ratio after switching the PCI combustion mode.

While the present invention has been illustrated and described with respect to a particular embodiment thereof, it should be appreciated by those of ordinary skill in the art that various modifications to this invention may be made without departing from the spirit and scope of the present invention.

What is claimed is:

1. An engine control method in which an engine is caused to perform diffusion combustion at normal times and switched from diffusion combustion to premixed combustion when an engine load is low, wherein
   when the engine is switched from the diffusion combustion to the premixed combustion,
   an oxygen concentration in an intake air of the engine is found, and
   when the found oxygen concentration exceeds a threshold of NOx generation oxygen concentration that has been set in advance, switching from the diffusion combustion to a fuel injection mode of the premixed combustion is stopped, and when the found oxygen concentration then becomes equal to or less than the threshold of NOx generation oxygen concentration, switching is performed to the premixed combustion.

2. The engine control method according to claim 1, wherein the threshold of NOx generation oxygen concentration is set correspondingly to a revolution speed and a fuel injection amount of the engine.

3. The engine control method according to claim 2, wherein the engine is switched to the premixed combustion when the engine makes a transition from a motoring state to an idle state.

4. The engine control method according to claim 1, wherein the engine is switched to the premixed combustion when the engine makes a transition from a motoring state to an idle state.

5. The engine control method according to claim 4, wherein
   exhaust gas recirculation in which part of exhaust gas of the engine is recirculated to the intake air is performed at least during the premixed combustion, and a premixed target exhaust gas recirculation ratio during the premixed combustion is set higher than a diffusion target exhaust gas recirculation ratio during the diffusion combustion, and
   when the engine is switched from the diffusion combustion to the premixed combustion,
   exhaust gas recirculation is performed at the premixed target exhaust gas recirculation ratio prior to switching to the premixed combustion such that the concentration of oxygen in the intake air of the engine is decreased.

6. An engine control system in which an engine is caused to perform diffusion combustion at normal times and switched from diffusion combustion to premixed combustion when an engine load is low, comprising:
   load measurement means for measuring a load of the engine;
   combustion control means for switching the engine between the diffusion combustion and premixed combustion and performing combustion control; and
   oxygen concentration measurement means for measuring a concentration of oxygen contained in an intake air of the engine, wherein
   the combustion control means switches the engine to the premixed combustion when the engine load measured by the load measurement means is equal to or less than a predetermined switching load, and the oxygen concentration detected by the oxygen concentration detection means is equal to or less than a predetermined threshold of NOx generation oxygen concentration.

* * * * *